Jan. 8, 1935.     T. J. HEAVEY     1,986,818
GUN MOUNT
Filed June 2, 1933     3 Sheets-Sheet 1
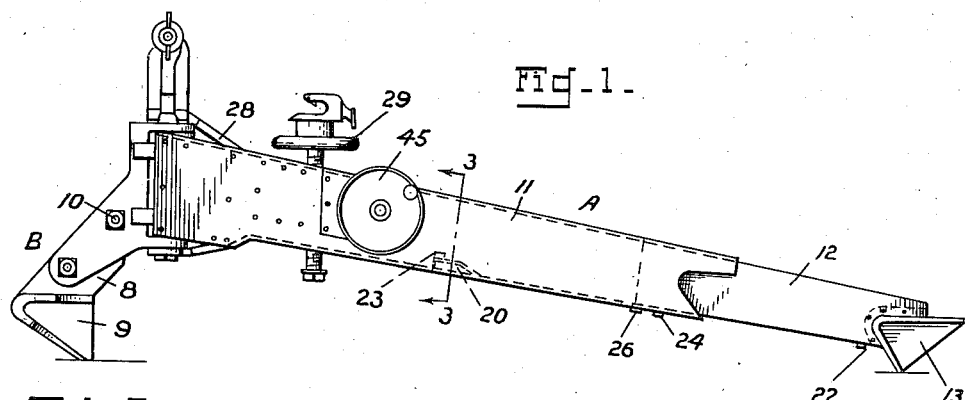
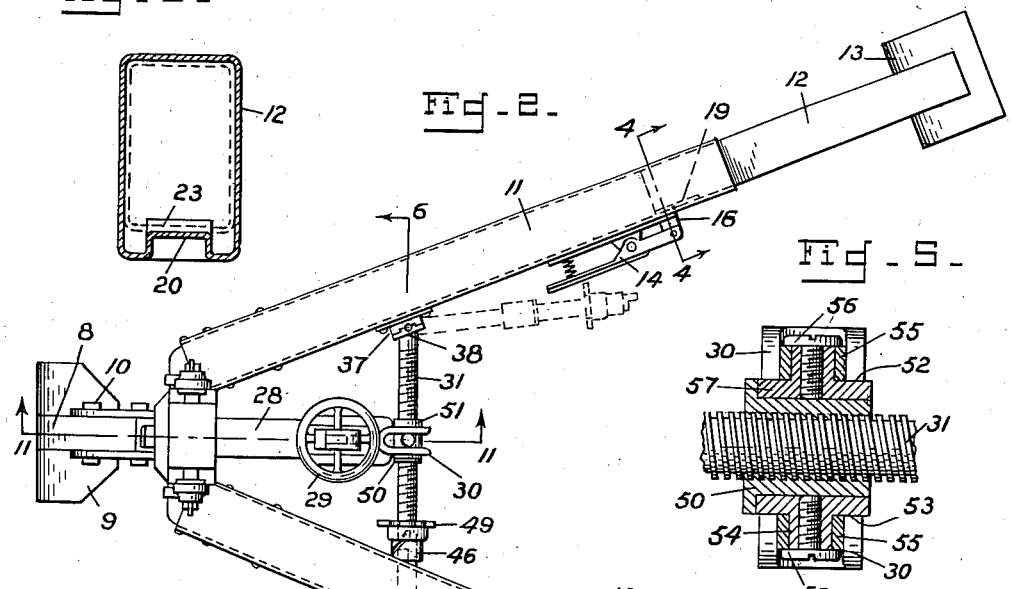
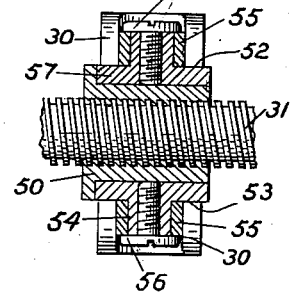
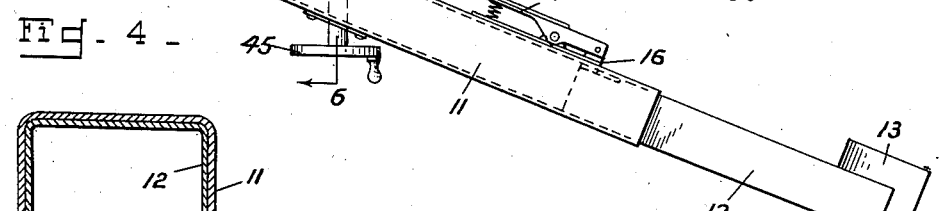
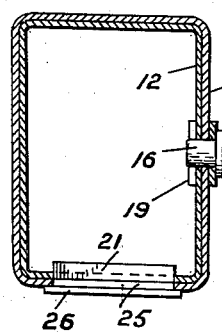
INVENTOR.
Thomas J. Heavey
BY W. N. Roach
ATTORNEY

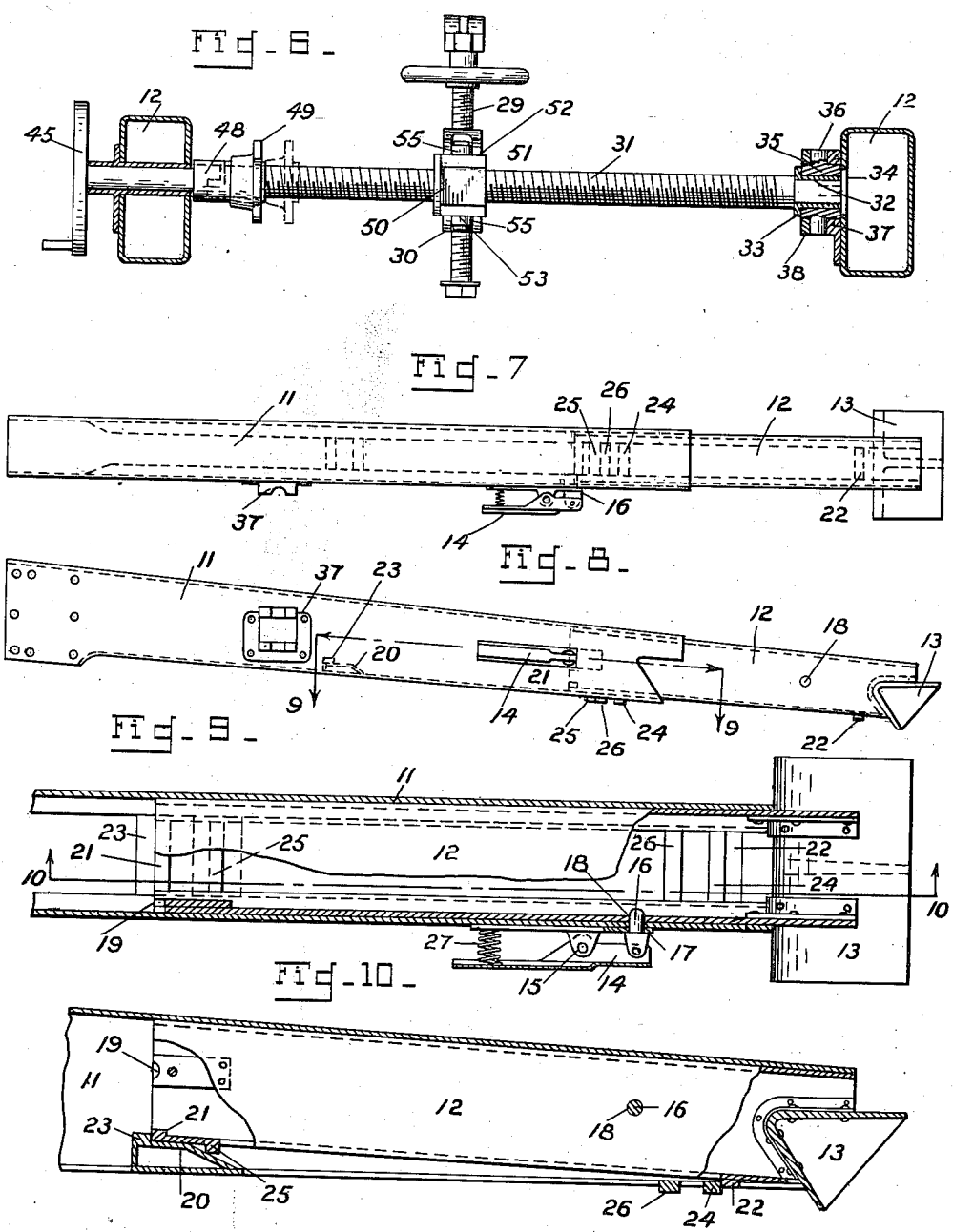

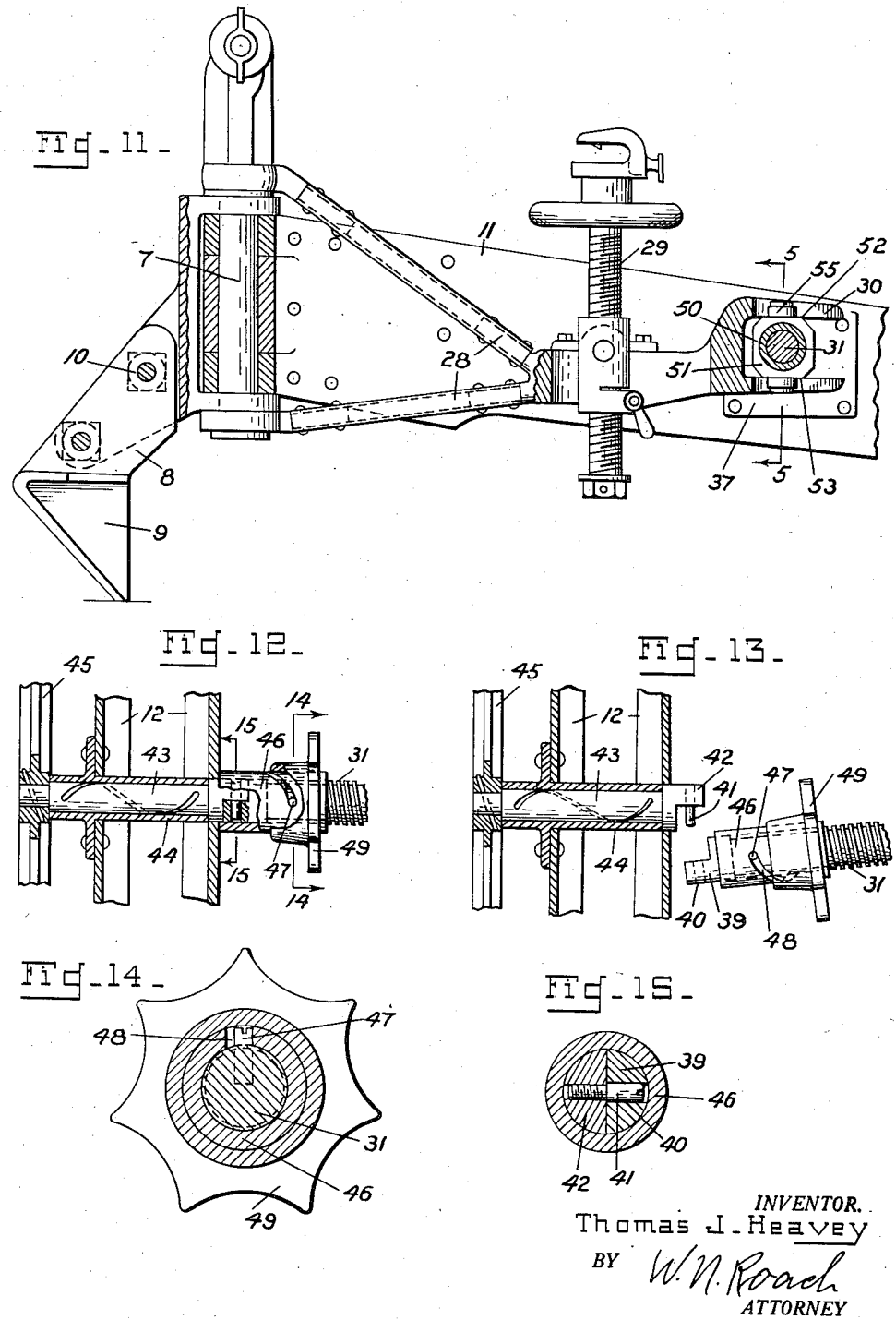

Patented Jan. 8, 1935

1,986,818

UNITED STATES PATENT OFFICE 1,986,818

GUN MOUNT

Thomas J. Heavey, United States Army, Fort Riley, Kans.

Application June 2, 1933, Serial No. 674,054

10 Claims. (Cl. 89—40)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a gun mount for light cannon such as the 37 m/m caliber, and is especially designed to permit pack transportation of the mount and gun on a single pack animal.

The principal object of the invention is to provide a light, compact mount that may be quickly folded into convenient load for transportation and as quickly arranged for firing.

The mount is characterized by a novel traversing mechanism capable of being folded to a position alongside one of the trails and by extensible trail legs automatically locked when moved to two positions of adjustment.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of the improved gun mount showing the trail legs extended.

Fig. 2 is a plan view of Fig. 1.

Fig. 3 is a detail sectional view on the line 3—3 of Fig. 1.

Fig. 4 is a detail sectional view on the line 4—4 of Fig. 2.

Fig. 5 is an enlarged detail sectional view of the traversing nut taken on the line 5—5 of Fig. 11.

Fig. 6 is a sectional view taken on the line 6—6 of Fig. 2.

Fig. 7 is a plan view of one of the extended trail legs.

Fig. 8 is a view in side elevation of the trail leg of Fig. 7.

Fig. 9 is a view on the line 9—9 of Fig. 8 but showing the trail leg closed.

Fig. 10 is a view on the line 10—10 of Fig. 9.

Fig. 11 is a sectional view on the line 11—11 of Fig. 2.

Figs. 12 and 13 are enlarged detail sectional views showing the screw shaft respectively connected to and disconnected from the operating shaft.

Figs. 14 and 15 are sectional views on the respective lines of Fig. 12.

The mount is in the form of a tripod comprising a pair of trail legs A—A and a front leg B, all hingedly mounted in a well-known manner on a pintle 7. The front leg which is extremely short is bifurcated to receive the shank 8 of a spade 9. The shank is rigidly secured to the front leg by bolts 10—10.

The trail legs A are similar and are formed of a front part 11 mounted on the pintle and a rear telescopic part 12 carrying a spade 13 on its outer extremity. As shown in Figs. 7 and 9 the parts 11 and 12 are locked in extended and closed relation by means of a latch 14 pivotally mounted in a bracket 15 on the outer surface of the front part 11 and including a pin 16 adapted to enter an aperture 17 in the front part 11 and selectively engage an aperture 18 in the rear portion of the part 12 and a semi-circular bearing 19 in the forward edge of the rear part 12.

In the closed position Fig. 10 the front end of the part 12 has been elevated by a ramp 20 carried by the part 11. This provision is made because of the taper of the trail leg and insures a close fit to prevent rattling. Movement of the parts to closed position is limited by stops 21 and 22 on the part 12 respectively engaging stops 23 and 24 on the part 11. The extension of the parts is limited by engagement of a stop 25 on the part 12 with a stop 26 on the part 11. The provision of the stop insures alignment of the pin 16 of the latch with the aperture 18 and bearing 19 and enables the pin to be automatically moved therein under the influence of the latch spring 27.

Referring to Fig. 11, a conventional gun supporting member 28 including an elevating mechanism 29 is positioned between the trail legs and pivotally mounted on the pintle. The rear or free end of this member is formed with spaced sets of fingers 30—30 whereby it may have a sliding connection with a mechanism for traversing said member about the pintle.

The traversing mechanism consists of a screw shaft 31 (Fig. 6) having a reduced end on which a bushing 32 is confined between a collar 33 and the head of a retaining screw 34. A sleeve 35 embracing the bushing and also confined between the collar and screw head is provided with trunnions 36—36 which when disposed vertically are received in a bracket 37 on the right hand trail and confined by cap plates 38. As indicated in dotted lines in Fig. 2 the screw shaft is capable of being swung to a position along side the trail leg.

As seen most clearly in Fig. 13 the free end of the screw shaft preferably terminates in a semi-cylindrical portion 39 having an aperture 40 adapted to receive a pin 41 fixed to the semi-cylindrical end 42 of a shaft 43. The pin serves as a driving connection between the shafts. The shaft 43 is mounted in a bearing 44 in the left hand trail and carries an operating hand wheel 45.

The shafts 31 and 43 are normally locked together by means of a sleeve 46 covering the joint between the semi-cylindrical ends 39 and 42. A pin 47 carried by the screw shaft 31 engages a cam slot 48 formed in the sleeve 46. The sleeve includes a handwheel 49 whereby it may be manually rotated. Upon rotating the sleeve it is constrained, by virtue of the pin and cam slot arrangement, to be moved to covering or uncovering position relative to the joint between the shafts. When the gun mount is in the firing position the shafts are connected and when the mount is to be arranged for travelling, with the trail leg folded together, the shafts are disconnected to permit the traversing screw shaft to be swung alongside one of the trails.

A nut 50 Fig. 5 on the screw shaft is fitted in a housing 51 having flat upper and lower surfaces 52 and 53 engaged by the sets of fingers 30 of the gun-supporting member 28 whereby the nut and housing are constrained against rotation and caused to be translated when the screw shaft is rotated. The surfaces 52 and 53 are each formed with a boss 54 over which is placed a ring 55 retained by a screw 56. Each ring 55 has a sliding fit between the fingers of each set and serves to impart the translational movement of the housing and nut to the gun-supporting member. The screws 56 bear against the nut and hold it in place relative to the housing.

In operation when it is desired to traverse the gun-supporting member 28 the handwheel 45 may be continuously rotated to translate the nut on the screw shaft. In order to prepare the mount for transportation the handwheel 49 is turned to move the sleeve 46 to uncovering position, whence the screw shaft may be swung rearwardly to disengage it from the gun-supporting member and position it alongside one of the trail legs. The trail legs may then be folded together. This operation is reversed in preparing the mount for firing.

I claim:

1. In a gun mount, a pintle, a front leg mounted on the pintle, a spade rigidly secured to the front leg, a pair of trail legs hingedly mounted on the pintle, and including extensible rear portions, means for automatically locking the extensible portions in two positions of adjustment, a traversing mechanism carried by both trails and including a separable part swingable alongside one of the trails, and a gun-supporting member mounted on the pintle and having a detachable connection with the traversing mechanism.

2. In a gun mount, a pintle, a pair of trail legs hingedly mounted on the pintle, a screw shaft mounted on one of the trail legs for swinging movement, the free end of said shaft being semi-cylindrical and having an aperture, an actuating shaft mounted in the other trail leg and having a semi-cylindrical end, a pin in said end adapted to enter the aperture in the end of the screw shaft, a sleeve on the screw shaft movable to covering and uncovering position relative to the joint between the semi-cylindrical ends, a cam slot in the sleeve, a pin on the screw shaft engageable with the cam slot, a nut on the screw shaft, and a gun-supporting member engageable by the nut.

3. In a gun mount, a pintle, a pair of trail legs hingedly mounted on the pintle, a screw shaft mounted on one of the trail legs for swinging movement, an actuating shaft mounted in the other trail leg, said shafts having complementary adjoining ends, a separable driving connection between the shafts, a sleeve on the screw shaft movable to covering and uncovering position relative to the joint between the ends of the shafts, a cam slot in the sleeve, a pin on the screw shaft engageable with the cam slot, a nut on the screw shaft, and a gun-supporting member engageable by the nut.

4. In a gun mount, a pintle, a pair of trail legs hingedly mounted on the pintle, a screw shaft mounted on one of the trail legs for swinging movement, an actuating shaft mounted in the other trail leg, a separable driving connection between the shafts, a sleeve on the screw shaft movable to covering and uncovering position relative to the joint between the ends of the shafts, a cam slot in the sleeve, a pin on the screw shaft engageable with the cam slot, a nut on the screw shaft, and a gun-supporting member engageable by the nut.

5. In a gun mount, a pintle, a pair of trail legs hingedly mounted on the pintle, a screw shaft mounted on one of the trail legs for swinging movement, an actuating shaft mounted in the other trail leg, a separable driving connection between the shafts, a sleeve on the screw shaft movable to covering and uncovering position relative to the joint between the ends of the shafts, cooperating means on the sleeve and screw shaft whereby upon rotation of the sleeve it is moved longitudinally of the screw shaft, a nut on the screw shaft, and a gun-supporting member engageable by the nut.

6. In a gun mount, a pintle, a pair of trail legs hingedly mounted on the pintle, a screw shaft mounted on one of the trail legs for swinging movement, an actuating shaft mounted in the other trail leg, a separable driving connection between the shafts, a sleeve on the screw shaft movable to covering and uncovering position relative to the joint between the ends of the shafts, a nut on the screw shaft, and a gun-supporting member engageable by the nut.

7. In a gun mount, a pair of foldable trail legs, a screw shaft mounted on one of the legs for swinging movement, an actuating shaft mounted in the other trail leg, a separable driving connection between adjoining ends of the shafts, means for locking the shafts together, and a traversing nut on the screw shaft.

8. In a gun mount, a pair of foldable trail legs, a screw shaft mounted on one of the legs for swinging movement, an actuating shaft mounted in the other trail leg, means for connecting and disconnecting adjoining ends of the shafts, and a traversing nut on the screw shaft.

9. In a gun mount, a screw shaft, a nut on the shaft, a housing on the nut having flat upper and lower surfaces, a boss on each of said surfaces, a ring on each boss, a screw retaining the ring and bearing against the nut, a member to be moved with the nut including sets of spaced fingers engaging the flat upper and lower surfaces of the housing, the fingers of each set slidably receiving one of the rings.

10. In a gun mount, a tapered trail comprising a front part and a rear part, the rear part movable into the front part, and a ramp on one side of the front part adapted to move the inner end of the rear part against the opposite side of said front part.

THOMAS J. HEAVEY.